United States Patent
Burmester

(10) Patent No.: US 8,496,027 B2
(45) Date of Patent: Jul. 30, 2013

(54) LIST VALVE, PARTICULARLY FOR PROCESS TECHNOLOGY

(75) Inventor: Jens Burmester, Grambek (DE)

(73) Assignee: GEA Tuchenhagen GmbH, Buechen (DE)

( * ) Notice: Subject to any disclaimer, the term of this patent is extended or adjusted under 35 U.S.C. 154(b) by 459 days.

(21) Appl. No.: 12/867,688

(22) PCT Filed: Feb. 13, 2009

(86) PCT No.: PCT/EP2009/001019
§ 371 (c)(1),
(2), (4) Date: Oct. 4, 2010

(87) PCT Pub. No.: WO2009/100920
PCT Pub. Date: Aug. 20, 2009

(65) Prior Publication Data
US 2011/0042602 A1    Feb. 24, 2011

(30) Foreign Application Priority Data

Feb. 16, 2008 (DE) .......... 10 2008 009 606
Apr. 22, 2008 (DE) .......... 10 2008 020 098

(51) Int. Cl.
*F16K 11/044* (2006.01)

(52) U.S. Cl.
USPC .......... 137/625.5; 251/63; 251/63.5; 251/324

(58) Field of Classification Search
USPC ............ 137/625.43, 625.48, 625.5; 251/63.5, 251/63, 62, 63.6, 324
See application file for complete search history.

(56) References Cited

U.S. PATENT DOCUMENTS

| | | | | | |
|---|---|---|---|---|---|
| 916,403 | A | * | 3/1909 | Adamson | 137/625.5 |
| 922,017 | A | * | 5/1909 | Milke | 137/625.27 |
| 3,122,065 | A | * | 2/1964 | Laun | 92/59 |
| 3,427,930 | A | * | 2/1969 | Roberts et al. | 92/12 |
| 3,811,279 | A | | 5/1974 | Vogeli | |
| 5,152,320 | A | * | 10/1992 | Zimmerly | 137/625.5 |
| 6,014,983 | A | * | 1/2000 | Sondergaard et al. | 137/312 |
| 6,155,300 | A | * | 12/2000 | Gross et al. | 137/872 |
| 6,382,239 | B1 | * | 5/2002 | Zimmerly | 137/312 |
| 7,191,791 | B2 | * | 3/2007 | Burmester | 137/312 |
| 7,198,058 | B2 | * | 4/2007 | Burmester | 137/312 |
| 8,336,572 | B2 | * | 12/2012 | Burmester et al. | 137/240 |
| 2011/0042604 | A1 | * | 2/2011 | Jens | 251/324 |

FOREIGN PATENT DOCUMENTS

| | | |
|---|---|---|
| DE | 2028544 | 12/1971 |
| DE | 2623039 A1 | 12/1977 |

(Continued)

OTHER PUBLICATIONS

Author unknown; HOVAP Varioflow pneumatic process valves; Nov. 17, 1988; published in Sneek, Netherlands.

*Primary Examiner* — Craig Schneider
(74) *Attorney, Agent, or Firm* — Vidas, Arrett & Steinkraus, P.A.

(57) ABSTRACT

The invention relates to a lift valve (1; 1.1; 1.2; 1.3), particularly for process technology. The aim of the invention is to design a process valve of the type in question which acts as a lift valve, has a uniform (monolithic or multi-piece) closing part or member, is altogether shorter than all previously known, comparable valves, has a very simple design, and can be used for various embodiments such as check valves, tank bottom valves, or reversing valves. Said aim is achieved by the fact that the closing part (4; 4.1) opens towards the actuator (3; 3*) while the ends of the driving spring (7; 7.1, 7.2) directly or indirectly rest against the actuation rod (4*a*/4*b*) and a cover part (3*b*), respectively, said cover part (3*b*) delimiting the driving housing (3*a*) on the side of the driving piston (5; 5*) that faces away from the closing part (4; 4.1).

37 Claims, 7 Drawing Sheets

FOREIGN PATENT DOCUMENTS

| | | | |
|---|---|---|---|
| DE | 3006409 A1 | 9/1981 |
| DE | 3106578 A1 | 9/1982 |
| DE | 3835944 A1 | 4/1990 |
| DE | 9013788 U1 | 12/1990 |
| DE | 20006594 U1 | 6/2000 |
| EP | 0039319 A1 | 11/1981 |
| EP | 0174384 A1 | 3/1986 |
| EP | 0646741 A1 | 4/1995 |
| EP | 0834689 A1 | 4/1998 |
| GB | 2096743 A | 10/1982 |
| WO | 2007/128360 A1 | 11/2007 |

\* cited by examiner

LIST VALVE, PARTICULARLY FOR PROCESS TECHNOLOGY

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a lift valve, particularly for process technology, with a valve housing consisting of at least one valve housing component, with at least a first and a second connecting sleeve, which are connected to the valve housing component and produce a connection to the interior space thereof, with a connection opening arranged in the valve housing between the connecting sleeves, in or on which connection opening a seating area is formed, with a translationally displaceable monolithic closing element that co-operates with the seating area and controls the connection opening, with one single actuation rod fastened on the closing element and being sealingly guided out of the valve housing through a housing opening of the same in front of the connection opening and being connected to a driving piston of an actuator, with a lantern housing connecting the valve housing with the actuator, with the actuator which has in a drive housing the driving piston that is displaceable against the force of a driving spring upon pressurization with a pressure medium, and with the actuation rod, which is enlarged in its cross section at least in the penetration region with the valve housing, such that it accommodates a part of the driving spring at the closing element side thereof in a pot-shaped recess.

The lift valve of the kind characterised in the beginning has the necessary features of a shut-off valve, wherein at least one component of the translational opening- and closing movement of its closing element realised as a seat disk is directed vertically against a seating area. Yet however, the lift valve can also be realised as a slide valve in the context of the above embodiment, wherein the closing element, realised as a slide piston, slides along a cylindrical seating area in its translational opening- and closing movement. A closing element seal disposed in the seating disk co-operates axially or axially/radially with the associated seating area (seal in the so-called pressure engagement), while a closing element seal disposed in the slide piston co-operates radially with the associated cylindrical seating area (seal in the so-called sliding engagement). The translational opening- and closing movement of the respective closing element is generated via a piston drive pressurized by a pressure medium, preferably via a pneumatically pressurized one, wherein the restoring movement of a driving piston is normally performed by a spring, preferably a helical spring. With respect to the closing element and the associated seating area, the piston drive may work in a spring-closed or in a spring-opened manner. In order to reduce the opening forces of the shut-off valve, the actuation rod of the closing element can be realised in the form of a so-called pressure compensation piston in the region of its penetration through the valve housing, so that the pressure forces from the fluid, present in the valve housing (from the product, e.g.) and acting on the closing element in the lifting direction, experience a partial to complete compensation on the projected front surface of the pressure compensation piston.

Process valves of the kind described above exist in a plurality of constructions, a so-called lantern housing being disposed between the valve housing and the actuator for safely separating a fluid present in the valve housing from the pressure medium that pressurizes the driving piston in the actuator. With respect to the vertical standard position of the valve, the opening movement of the process valve takes place either towards the upside or towards the downside, so that one speaks of a valve opening towards the upside or towards the downside. Because an overall height as small as possible towards the downside is normally desired, the actuator is disposed above the valve housing in the standard case.

A decisive criterion of choice for process valves of the kind in question is not only its overall height towards the downside, but also that towards the upside. The latter is essentially determined by the realisation of the lantern housing and the actuator, the latter requiring at least an overall height for the spring(s) and for the valve stroke in form of the stroke of the driving piston (for instance according to DE 30 06 409 A1).

Actuators for lift valves are furthermore known which have two closure parts or closing elements that are movable with respect to each other (in the following, the designations "closure part" and "closing element" are used synonymously) and are designated as so-called double seat valves, in which the axial extension of the lantern housing, the length of the necessary springs in the assembled condition and if applicable the stroke of the driving piston or the driving pistons each sum up completely. Such a double seat valve that opens towards the upside, towards the actuator, is described in DE 26 23 039 A1. In order to produce a pressing force between the two closing elements in the opened position, this double seat valve requires a second spring whose length sums up to that of the main spring. A double seat valve in this regard which opens towards the downside, away from the actuator, is known from DE 31 06 578 A1. Here, in order to save overall height, the second spring is housed in the constructional space of the main spring.

In the double seat valves mentioned above, the actuation rods of the closing elements are normally realised in the form of so-called pressure compensation pistons, in particular then when the latter are realised as slide pistons. In order to ensure sufficient compensation of the forces on the respective closing element by corresponding counter-forces on the associated pressure compensation piston, these pressure compensation pistons are mostly enlarged with respect to cross section up to the effective projected cross section of the associated closing element. The big opening areas through the valve housing caused by this make the sealing of these pressure compensation pistons difficult at the one hand, but on the other hand, the pressure compensation piston offers constructional space in its interior for an overall height saving accommodation of the springs of the actuator.

A solution in this regard is known for instance from EP 0 834 689 A1. Here, a spring packet forming the main spring and consisting of two concentrically interlaced helical springs, is arranged in a spring cage, which engages into a pressure compensation piston formed on the upper closing element and ends at its lower end, with its fixed spring abutment, on the inner space of the neighbouring valve housing. In the opened position of the double seat valve which opens towards the downside, it becomes evident that the lower end of the spring cage acting as a fixed spring abutment cannot be displaced with respect to the valve housing, and only the upper end of the spring packet experiences an axial displacement corresponding to the valve stroke during the opening process of the double seat valve. So, it becomes clear that the overall height of the actuator is at least determined by the extent of the axial extension of the biased spring packet in the closed position of the valve.

In a double seat valve described in EP 0 039 319 B2, two springs in the pressure compensation piston that sum up in their constructional length are arranged on the upper closing element, which engage up to the seat region, while the pressure compensation piston on the lower closing element acts a driving piston of the actuator, and thus, no additional constructional height is required for the stroke of the driving piston. Through this construction of the upper pressure compensation piston with respect to the arrangement of the springs, overall height is saved in fact on the one hand, but on the other hand this leads to cross section narrowing in the upper valve housing. In order to compensate this narrowing, an opening area of the valve housing greater than that in the seat region between the two valve housing components is in turn necessary at least in the penetration region of the associated pressure compensation piston. A lantern housing in the classical sense is not provided; instead, a so-called rinsing lock prevents the mixing of pressure medium in the actuator and fluid in the valve housing.

From EP 0 174 384 B1, a double seat valve developed further from EP 0 039 319 B2 is known, in which is provided, in addition to the older double seat valve, amongst others a partial stroke of a driving piston for the seat cleaning of the upper closing element, which necessitates an additional overall height.

The principle described above for the arrangement of one or plural springs within a spring cage, which engages with its lower end acting as a fixed spring abutment into a pressure compensation piston of a closing element that opens towards the downside, is also used for lift valves which have one single closure part or closing element, respectively. A lift valve relating to this is known under the company-generated designation Kode 8222 from the company document HOVAP Varioflow pneumatische Prozessventile, HOVAP INTERNATIONAL (HOLLAND) B. V., Sneek (NL), VAC.9.86.D.

In fact, this known solution saves more overall height than such solutions where the inner space of the pressure compensation piston is not used or cannot be used for accommodating the driving spring(s). However, there remains the general disadvantage that the entire length of the driving spring, namely in a biased length as the same is required in the closed position of the lift valve, must be accommodated by the actuator. Moreover, like in the present case, the overall height of the valve in the region of its actuator still comprises the full valve stroke in addition, because a rod connected to the closing element is guided towards the upside through the front side of the actuator, amongst others in order to guide the closing element.

Even the manner how the valve housing and the actuator are connected via the lantern housing exerts an influence on the overall height of the respective process valve, this influence rather being small in this. More decisive in this context is the influence of this connection on the expense for mounting and dismounting and on the cost for realising this connection. Since a tenfold of years, essentially the three kinds of such a connection shortly delineated below are being realised.

On the one hand, it is dealt with a connection via flanges that are screwed together with each other. The documents EP 0 646 741 B1 and EP 0 174 384 B1 each show a connection related to this between valve- and lantern housing in a double seat valve. This connection is time-consuming in mounting and dismounting, and a rotation between valve housing and drive is possible only according to the extent of the circumferential separation of the connecting screws.

On the other hand, in the majority of all the process valves of the kind in question, the so-called clamp flange connection is preferred today, which is disclosed for instance in DE 200 06 594 U1 (process valve with one single closing element) or in DE 38 35 944 A1 or in EP 0 834 689 A1 (both dealing with a double seat valve). In these, the housing components that are to be connected with each other each have a so-called clamp flange, which is conically inclined radially towards the outside at its outside flank. The respective pair of clamp flanges, which symmetrically tapers towards the outside, is held together by a divided clamping ring complementary to the inclined flanks and covering almost 360 degrees, wherein the two clamp ring halves are connected to each other and held together either via an articulation at the one side and a screw joint at the other side, or via two screw joints. A connection related to this is friendly for mounting and dismounting and it is possible to position the drive with respect to the valve housing in every arbitrary position. However, the cost for such a connection is higher than with a screwed flange connection.

Finally, it is known to perform the connection between valve- and drive housing via a screw joint (for instance a so-called pipe screwing according to DIN 11851 or DIN 11864) (WO 2007/128360 A1). Here, the lantern housing normally carries the groove nut, and the exterior thread is formed on the valve housing. This connection is preferably used in sterile unit operation processes, because the groove nut offers less contact surfaces towards the outside for contamination than a screwed flange or clamping connection. The cost are highest compared with the two kinds of connection mentioned above; however, the disadvantages of the kind mentioned above are not existent.

The document DE 90 13 788 U1 describes a connecting piece for an auxiliary apparatus for the heat- and water supply, in particular for a water counter, a heat counter or a filter top, with a shut-off valve that is rotatably mounted in a housing between a passage position and a closing position, and with a top for the auxiliary apparatus that is adapted to be detachably connected to the housing. Here, the top is connected to the housing by way of a bayonet joint, in which a bolt is guided in an L-shaped groove. The top is coupled to the shut-off valve in such a way (this means concretely a catching connection in the circumferential direction, not a clamp connection in the axial direction) that when mounting the top on the housing, the shut-off valve is opened, and closed when it is being dismounted.

In WO 2007/128 360 A1 are described housing aggregations for monitoring-, control and regulation systems for a process valve. The respective housing aggregation consists of a series of individual housing tops, which are connected to each other by way of a bayonet joint like connection mechanism.

It is the objective of the present invention to provide a process valve acting as a lift valve of the kind described in the beginning with an uniform closure part or closing element, respectively, (irrespective whether in one or plural parts), which altogether features a shorter overall height than all the known and comparable valves relates to this, which is very simple in its construction and which is furthermore applicable to the different embodiments like shut-off-, tank bottom- or reversing valves.

SUMMARY OF THE INVENTION

Advantageous embodiments of the lift valve of the present invention are the subject matter of the subclaims.

The solution of the objective is achieved by plural features, which partly determine each other. To these belongs amongst others that the valve opens towards the upside, toward an actuator, and that one single actuation rod, affixed to a monolithic closing element (irrespective whether in one or plural pieces) is enlarged in its cross section at least in its penetrating region with a valve housing, in such a way that it receives the closing element side part of a driving spring there. Furthermore, the driving spring rests at its end sides directly or indirectly against the actuation rod at the one side, and at the other side against a cover part, which delimits a drive housing on that side of the driving piston which faces away from the closing element.

In a preferred embodiment, the actuation rod is realised such that a cross-section enlarged actuation rod is connected to the closing element via a cross-section reduced actuation rod that is smaller in its cross section. The transition region between the cross-section enlarged and the cross-section reduced actuation rod is used in a preferred embodiment such that a counter-pressure area on the cross-section enlarged actuation rod is associated to the closing element, in order to compensate pressure shocks in the interior space of the valve housing. Furthermore, the cross-section enlarged actuation rod projects into the valve housing at least for the full valve stroke, wherein the minimum dimension is preferred because a farther reaching engagement would lead to a disadvantageous constriction of the valve housing, with an increased flow resistance for the flow in the valve housing being accompanied by this. The minimum dimension still ensures a safe seal between the pressure compensation piston and the associated radial seal in the opened position of the shut-off valve. Optimum mounting conditions result for the driving spring in the pot-shaped recess then when with respect to its cross section, the latter continues up to the driving piston without becoming narrower, and in particular then when a pot bottom of the pot-shaped recess forms a spring abutment of the driving spring at the closing element side thereof. Through this, the cover part becomes a fixed, stationary upper spring abutment, and the bottom of the pot-shaped recess a movable lower spring abutment that is axially displaceable for the extent of the valve stroke. Such an arrangement of the driving spring reduces the constructional space necessary for it to an axial length that is as short as possible, which is reduced for at least the dimension of the full valve stroke compared to the solutions of the state of the art explained above.

The features indicated above yield a realisation of the actuator in which the stroke of the driving piston is implemented below the fixed, upper spring abutment, so that no additional overall height from the piston drive is necessary besides to the constructional length for the biased spring resulting from the closed position of the valve.

In order to comply for instance the US requirements of the so-called 3-A Sanitary Standard for Compression-Type valves, which require amongst others that the actuator must be adapted to be easily dismounted from the valve housing and the actuation rod, one embodiment of the lift valve of the present invention provides that the actuation rod is structured dividable for the purpose of dismounting the actuator from the valve housing. Regarding to this, it is purposefully provided to divide the cross-section enlarged actuation rod into a component of the actuation rod at the closing element side and a component of the actuation rod at the drive side, wherein a sealed positive and non-positive connection of these components takes place via a nut thread at the closing element side component, and via an exterior thread on the drive side component. So, the lower component remains on the closing element via the cross-section reduced connection rod, and according to a further proposition, the upper component of the actuation rod is detachably connected to the driving piston on a rod end at the drive side.

In order that the biased driving spring arranged within the actuation rod cannot untension itself in an uncontrolled manner in the separation of the latter, it is furthermore proposed that on its end at the closing element side, the drive side component of the actuation rod lengthens into a pot, which engages into the closing element side component of the actuation rod and there forms the pot-shaped recess having a second pot bottom. The realisation of the pot-shaped recess takes place maintaining that contour which is provided in the undivided embodiment of the actuation rod.

A further embodiment provides that on the one end, the lantern housing has a pipe-shaped lantern shaft with a lantern flange at the drive side, and means for connecting the lantern housing with the valve housing on the other end, and at least one lantern opening disposed in the lantern shaft and breaking through the same. To shorten the overall height of the valve further towards the upside contributes a proposition which provides that the lantern housing is directly fixed on the actuator with its lantern flange. This connection is purposefully performed in a positive fit on the bottom of the drive housing, so that the otherwise usual flange- or clamp flange connection with the sumptuous locking mechanism does not apply here. A further shortening of the overall height is achieved in that the lantern flange forms the border of the drive housing at the valve housing side at the same time, which is also provided.

Because the valve housing is connected to the drive housing directly via the lantern housing, and the actuation rod with the driving spring that is received in its pot-shaped recess penetrates this lantern housing completely on the entire length thereof, the lantern housing does not require any additional overall height for itself in the context of the overall arrangement.

In many cases, it is desired that a control head for accommodating means for controlling the valve and for the feedback of its positions can be disposed above the actuator. For this purpose, it is provided the actuation rod is detachably connected to a feedback rod, which concentrically penetrates the actuator and which in the closed position of the lift valve permeates the cover part and a clamp flange, formed on the same at the outside thereof and serving for the connection of a control head, said feedback rod ending in an overhang with respect to the clamp flange.

As was pointed out above, the lift valve in question is equipped in its seat region with a closing element that is realised either as a seat disk or as a slide piston. In the latter case, the axial limitation of the valve stroke towards the downside is performed for instance by the rest of the driving piston on the bottom of the drive housing. At the seat disk, the seating area is realised either planar or conically, and it co-operates by its closing element seal purely axially or axially/radially with the associated seating area. The axial limitation of the valve stroke towards the downside for reaching an unambiguously position-determined closed position takes place in this case by preferably metallic rest of the closing element on the associated seating area, wherein this metallic rest is ensured by a suitable realisation of the sealing groove into which the closing element seal can evade in the closed position.

The lift valve of the present invention is realised either spring closing or spring opening. In the first case, provided that the driving piston is not pressurized by pressure medium, the closing element is brought into its closed position via the biased driving spring. In this, as was already pointed out above, the driving spring rests at the one side on the closing element, the movable lower spring abutment, and at the other side on the cover part of the drive housing, the stationary upper spring abutment.

In a spring opening embodiment, in case that the driving piston is not pressurized by pressure medium, the closing element is brought into its opened position via the biased driving spring. In order to achieve this in the context of the lift valve of the present invention, an advantageous embodiment relating to this provides that at its end facing the closing element, the driving spring is supported on a first support plate, which is fixedly connected to the cover part via a connection rod that penetrates the driving spring. On its other end, the driving spring rests on a contact position on the actuation rod, which according to a preferred embodiment is realised as a second support plate, which is fixedly clamped between the driving piston and the drive side end of the actuation rod.

According to a further inventive idea, the lantern housing is attached to the valve housing by an overall height saving bayonet joint or a bayonet-like connection. Through the bayonet mechanism, even at this connection location otherwise usual sumptuous locking mechanisms can be omitted, by which the entire arrangement is significantly constructionally simplified further in the sense of the invention's objective.

A preferred embodiment of the bayonet joint provides that at its valve housing side end, the pipe-shaped lantern shaft has at least two lantern side bayonet collars projecting towards the inside when seen in the radial direction, which are each delimited on both sides by lantern side bayonet recesses realised between them. On the outside and in the circumference region of the housing opening, the valve housing has a corresponding number of valve housing side bayonet collars projecting towards the outside when seen in the radial direction, which are each delimited on both sides by valve housing side bayonet recesses realised between them. The lantern side bayonet collars engage into the valve housing side bayonet recesses in an opened position of the bayonet joint, and in a closed position of the bayonet joint they almost coincidently grip behind the valve housing side bayonet collars.

When two lantern side bayonet collars are provided which are situated diametrically opposite to each other, as this is proposed further, or more than two are provided, which are disposed evenly distributed over the circumference of the pipe-shaped lantern shaft, then the drive housing, and together with this a connection piece for pressure medium provided on it, can be selectively rotated with respect to the valve housing for 180 degrees or for a smaller angle which results from the number of the bayonet collars, and thus be fastened on the same in these discrete positions.

According to a further inventive idea, the actuation rod is guided in a pipe-shaped bearing bush, which is arranged and fixed inside the lantern housing and which makes use of the axial length thereof as far as possible. This guiding of the actuation rod serves at the same time for guiding the driving piston that is fixedly connected to the same. As the actuation rod is fixedly connected to the closing element, the latter experiences its axial guiding indirectly also via the bearing bush, so that no additional overall weight is necessary for these guiding means in the context of the overall arrangement.

The function of the lantern housing, which besides to its mechanical connection function ensures the safe separation of valve- and drive housing with the different and incompatible fluids existing therein, is not affected by the mentioned bearing bush, because the latter has at least one bearing bush opening, penetrating the wall of a pipe-shaped bush shaft when seen in the radial direction. In order to ensure discharge of leakages, a further proposition provides that the at least one bearing bush opening is at least partially covered up by the at least one lantern opening in a fluid-permeable manner. This at least partial coverage is ensured for instance by a rotation-blocked arrangement of the bearing bush within the lantern housing that receives the same, for instance by a positively fitting connection or toothing. In this, the bayonet collars at the valve housing side that engage into the lantern housing support the bearing bush axially towards the downside.

In the region of the housing opening relating to this, the penetration site between the actuation rod and the valve housing requires a sealing by way of a rod seal, which must be under a sufficient radial bias in the assembled condition, in order to ensure a sufficient sealing action. In the lift valve of the present invention, this radial bias in the assembled condition is generated only by a minimal axial deformation of the rod seal during the closing process of the bayonet joint. Through this, the rod seal and the closing element in connection to its actuation rod can be furthermore dismounted easily and without using special tools. According to an advantageous embodiment, this is achieved in that a valve housing side bush flange of the bearing bush rests on the valve housing which surrounds the housing opening at the outer side, and that it axially biases a rod seal disposed between the housing opening and the cross-section enlarged actuation rod through this.

Because it cannot be excluded that in the operation of the lift valve, a liquid, like product or cleaning agent, is carried over by the so-called "escalator effect" into the seal region or if applicable behind the rod seal, when seen from the inner space of the valve housing, it must be taken care that this carried-over liquids can at least drain off without pressure. For this purpose, it is provided that several grooves distributed over the circumference engage into the front side of the bearing bush at the valve housing side, which piercingly cross the bearing bush on these locations, whereby drainage is ensured radially at the outer side via the bayonet joint.

According to another advantageous embodiment, the bayonet joint or the bayonet-like connection is automatically positively fitting locked in its closed position. This locking is achieved by several measures, which in parts mutually determine each other. At the one hand, it is provided that in the extension region of at least one lantern side bayonet collar with respect to the circumference, the pipe-shaped lantern shaft has a slit, which extends somewhat into the bayonet collar from the valve housing side of the lantern shaft, and by doing so piercingly from the inside towards the outside when seen in the radial direction.

On the other hand, it is provided that radially at the outer side, each valve housing side bayonet collar has a groove-shaped recess, delimited in its radial depth and its circumferential extension, wherein in the closed position of the bayonet joint, the recess is positioned coincidently with the associated slit when seen in the circumferential direction. In a preferred embodiment, the respective recess is disposed centrally in the associated bayonet collar at the valve housing side when seen in the circumference direction.

Furthermore, in the region of the valve housing side end of the bearing bush, at least one nose is disposed on the same which, when seen in the radial direction, is salient over the outer border of the bearing bush at the one hand, and which on the other hand, when seen in the axial direction, extends beyond the front side of the bearing bush at the valve housing side thereof. This nose, when seen in the radial direction, is realised spring-resiliently and engages into the associated slit. Through this, the already above-mentioned rotation-blocked fixation of the bearing bush within the lantern housing is secured.

The automatic locking of the bayonet joint, which prevents its unplanned opening at the same time, is achieved in that jointly to the above-represented features, in the locking position of the bayonet joint, the end of the nose engages into the associated groove-shaped recess in the valve housing side bayonet collar. The spring-resilient realisation of the nose makes it possible that from out the opened position of the bayonet joint, it can at first bend itself up radially so far towards the outside, that on the path into the closed position of the bayonet joint, it grips beyond the outer border of the valve housing side bayonet collar and slips tangentially over the same, until it snaps towards the inside into the groove-shaped recess with positive fit under elastic back-deformation. Through this is ensured a positively fitting connection between the bearing bush and through this the lantern housing at the one hand, and the valve housing at the other hand.

The present invention further provides that the respective features pointed out above are applied to a shut-off valve, and the valve housing is realised in the form of a first valve housing acting as a shut-off valve housing.

In the same way, the respective features pointed out above are to be applied to a tank bottom valve, wherein the second connecting sleeve runs out from the downside into a tank bottom of a tank or container, and the valve housing is realised in the form of a second valve housing acting as a tank bottom valve housing.

Finally, the respective features pointed out above are to be applied to a reversing valve, wherein the lantern housing is connected to the valve housing component via a second valve housing component having at least one fourth connecting sleeve, and through this the valve housing is realised in the form of a third valve housing acting as a reversing valve housing, wherein the two valve housing components are connected via a second connection opening in or on which a second seating area is realised. In addition, to the actuation rod is attached a second closing element, which co-operates with the second seating area via a radially acting second closing element seal and which controls the second connection opening, wherein in the closed position of the second closing element, the closing element forming a first closing element, and in the closed position of the first closing element the second closing element occupy their respective opened positions. With regard to a great application range of the lift valve of the present invention, the third valve housing becomes a passage housing when in addition to the fourth connecting sleeve, it has on the second valve housing component a fifth connecting sleeve, which is situated opposite to the fourth connecting sleeve, like this is proposed.

Also with regard to the above mentioned great application range, the valve housing of the shut-off-, tank bottom- and reversing valve described above becomes in each case a passage housing when in addition to the first connecting sleeve, the valve housing has on the valve housing component a third connecting sleeve, which is situated opposite to the first connecting sleeve.

BRIEF DESCRIPTION OF THE SEVERAL VIEWS OF THE DRAWINGS

A description in more detail will result from the following description and the attached figures of the drawing, and also from the claims. While the present invention is realised in very different embodiments, one realisation example of preferred embodiments of the proposed lift valve at a time is depicted in the drawing and described according to construction and function in the following, with the proviso that these embodiments represent only examples for the present invention, but the invention is not restricted to these specially represented examples.

DETAILED DESCRIPTION OF THE INVENTION

Figure 1:
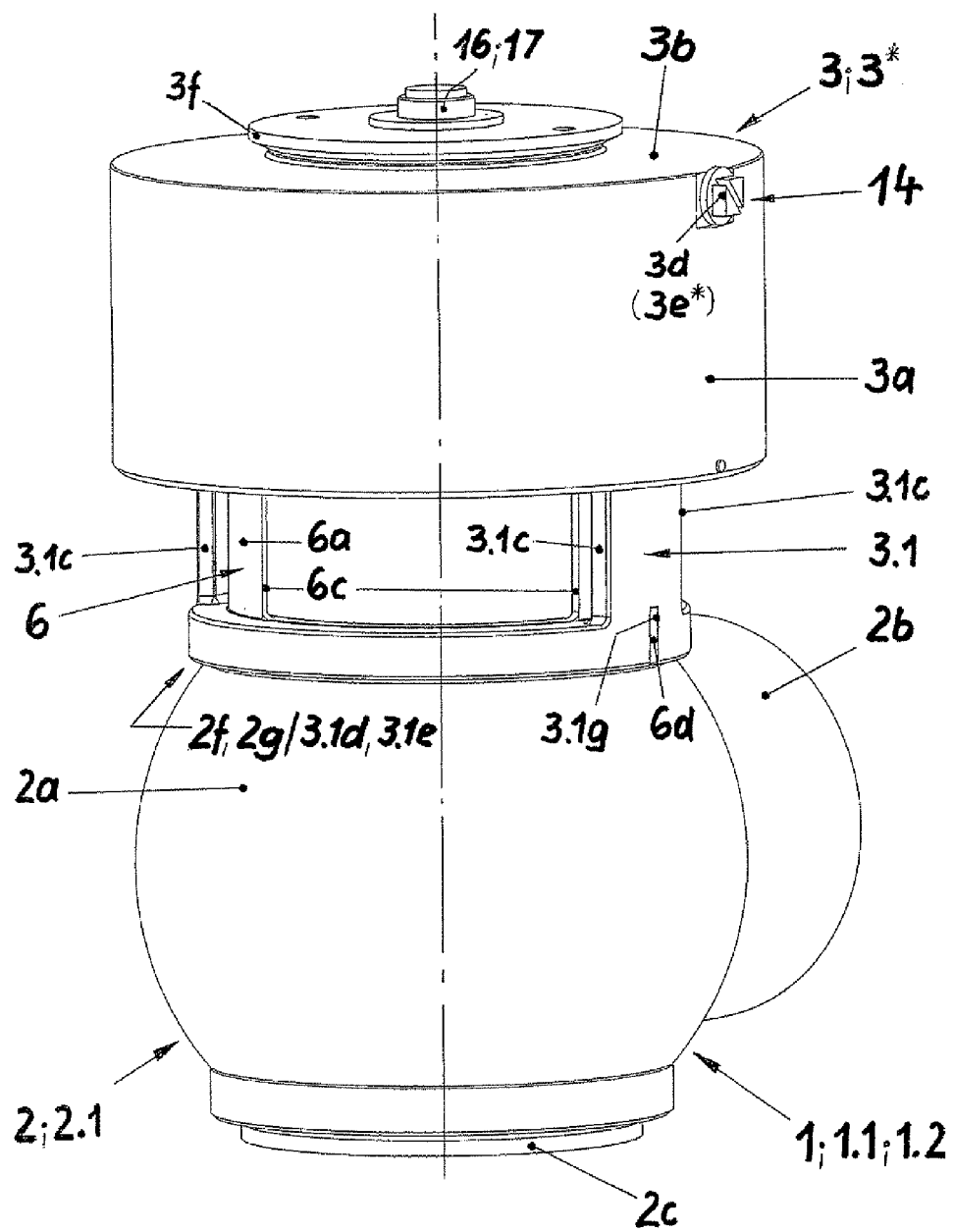
FIG. 1 an overall view of the lift valve of the present invention in a perspective representation, in a realisation as a shut-off valve.

While this invention may be embodied in many different forms, there are described in detail herein a specific preferred embodiment of the invention. This description is an exemplification of the principles of the invention and is not intended to limit the invention to the particular embodiment illustrated A lift valve 1 of the present invention realised as a shut-off valve 1.1 (FIG. 1) essentially consists of a valve housing 2 in the form of a first valve housing 2.1 (shut-off valve housing), which consists by way of example of a central, preferably globularly realised valve housing component 2*a*, a first connecting sleeve 2*b* laterally extending from the same and a second connecting sleeve 2*c* extending downward with respect to the position in the representation (see also FIG. 7 for this). It furthermore consists of a spring-closing first actuator 3 (FIG. 2) or a second spring-opening actuator 3\* (FIG. 3), in which a driving piston 5 or a modified driving piston 5\*, respectively, is normally pressurized with a pneumatic pressure medium D (compressed air) via a first or second, respectively, pressure medium opening $3e$, $3e^*$ realised in a drive housing $3a$. The ventilation in both directions of the actuator $3$, $3^*$ takes place during the switching movement on that side of the driving piston $5$, $5^*$ that is facing away from the pressurization via a first ventilation opening $3d^*$ in a ventilation plug $14$ (FIG. 1), or via a second ventilation opening $3d^*$ in a ventilation plug $14^*$ (FIG. 3). Besides to the above-mentioned spring-closing or spring opening embodiment, the actuator $3$, $3^*$ is also realised with double action. The last-mentioned embodiment, which is not represented, has a further pressure medium opening on the other side of the driving piston $5$ or $5^*$, respectively, on the drive housing $3a$, besides to other modifications of this actuator not indicated here. In addition to the first connecting sleeve $2b$, the valve housing component $2a$ has if need be a third connecting sleeve $2b^*$, which is situated opposite to the first connecting sleeve $2b$, so that the valve housing $2$, $2.1$ becomes a passage housing.

In the valve housing $2$, $2.1$ (FIG. 2) between the connecting sleeves $2b$, $2c$, a connection opening $2d$ is arranged, in or on which a seating area $2e$ is formed. A closing element $4$, translationally displaceable towards the actuator $3$, co-operates with the seating area $2e$ and controls the connection opening $2d$. On the closing element $4$ is fixed an actuation rod $4a/4b$, which is sealingly guided out of the valve housing $2$, $2.1$ through a housing opening $2h$ situated opposite to the connection opening $2d$ and which is firmly, but detachably connected to the driving piston $5$, $5^*$ of the actuator $3$, $3^*$. In the drive housing $3a$, the actuator $3$, $3^*$ has the driving piston $5$, $5^*$, which is displaceable against the force of a driving spring $7$ or $7.1$, $7.2$, respectively, when being pressurized by the pressure medium D. At least in the penetration region with the valve housing $2$, $2.1$, the actuation rod $4a/4b$ is enlarged in its cross section in such a way that it receives there in a pot-shaped recess $4c$ a closing element side part of the driving spring $7$ or $7.1$, $7.2$, respectively.

The valve housing $2$, $2.1$ and the pneumatic actuator $3$, $3^*$ are directly connected with each other via a lantern housing $3.1$. In this, a drive side lantern flange $3.1a$ provided on the lantern housing $3.1$ at the side of the actuator $3$, $3^*$ (see also FIG. 6 for this) forms the valve housing side limitation of the drive housing $3a$. On its side facing away from the valve housing $2$, $2.1$, the actuator $3$, $3^*$ is closed by a cover part $3b$ (FIGS. 2, 3, 1), which continues at the outer side and the centre in a clamp flange $3f$ with smaller diameter, and is also penetrated in the centre by a feedback rod $16$, connected to the actuation rod $4a/4b$ preferably detachably, or by a modified feedback rod $17$, respectively. Either the upper end of the feedback rod $16$, $17$ indicates the respective position of the lift valve $1$ in the simplest development optically, or the upper end is captured with or without contact and feedback is given via a control head disposed on the clamp flange $3f$ to an internal or external control device controlling the lift valve $1$.

Figure 8:
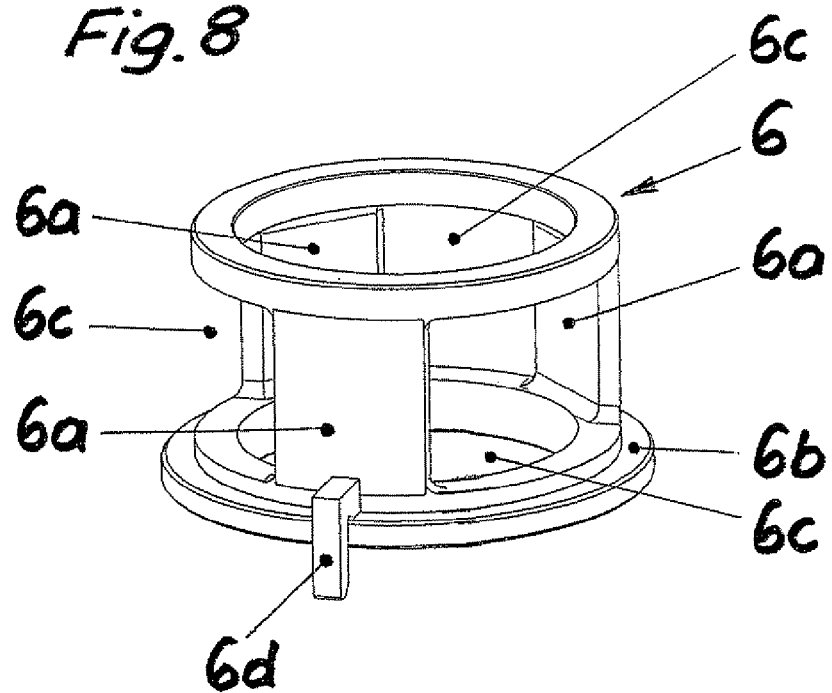
FIG. 8 an embodiment of a valve housing in a perspective representation, which is complementary to the lantern housing of FIG. 6, wherein the view is directed to the long side and to the nose that serves for locking the bayonet joint, and FIG. 9 the bearing bush of FIG. 8 in a perspective representation, seen in an angle of view from the downside.
Figure 9:
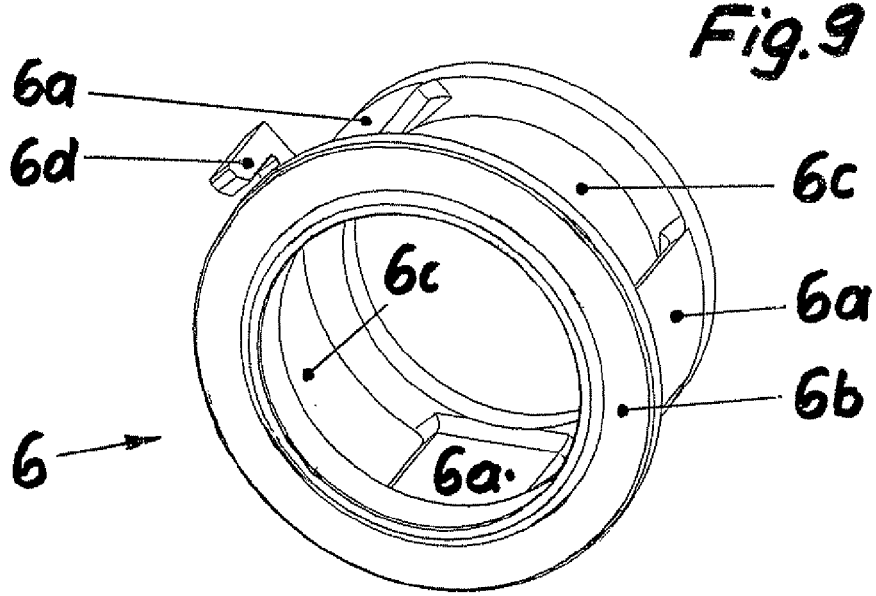

The lantern housing $3.1$ (FIG. 6) has a pipe-shaped lantern shaft $3.1b$ with the drive side lantern flange $3.1a$ at the one end, and means $3.1d$, $3.1e$ for connecting the lantern housing $3.1$ with the valve housing $2$, $2.1$ at the other end, and with two lantern openings $3.1c$ disposed diametrically in the lantern shaft $3.1b$ and breaking through the same. The means $3.1d$ and $3.1e$ are a lantern side bayonet collar $3.1d$ and a lantern side bayonet recess $3.1e$. The two lantern openings $3.1c$ are at least partially covered up (FIG. 1) by three bearing bush openings $6c$ in a bearing bush $6$ (FIGS. 8, 9), so as to be permeable for fluid, so that via these openings $3.1c$, $6c$ there is a connection between the surroundings of the shut-off valves $1.1$ and a cross-section enlarged actuation rod $4a$, a so-called pressure compensation piston (see also FIG. 2). The bearing bush openings $6c$ are realised in a pipe-shaped bush shaft $6a$ of the bearing bush $6$, wherein at its lower end, the bush shaft $6a$ merges into a valve housing side bush flange $6b$ that projects radially towards the outside.

At the lower end of the valve housing $2$, $2.1$ (FIG. 2), above the second connecting sleeve $2c$, which delimits the connection opening $2d$ for instance towards a not shown pipeline leading away or to a tank, in the inner wall of the central valve housing component $2a$, concentric to the vertical symmetry axis thereof, the seating area $2e$ is formed which is realised cylindrical in the realisation example and in which the closing element $4$, realised as a slide piston, is sealingly accommodated with its closing element seal $9$. The closing element seal $9$ co-operates purely radially with the cylindrical seating area $2e$, and the closed position of the shut-off valve $1$, $1.1$ is preferably delimited by a firm abutment of the driving piston $5$, $5^*$ in the actuator $3$, $3^*$, preferably on the drive side lantern flange $3.1a$.

Furthermore, it is provided to realise the closing element $4$ as a seat disk with an axially or axially/radially closing element seal $9$, which co-operates with the associated seating area $2e$, which is then realised axially or conically, and to delimit the closed position of the lift valve $1$, $1.1$ by a firm abutment of the closing element $4$ on the respective seating area $2e$.

At the upper side, the closing element $4$ merges into a cross-section reduced connection rod $4b$ (FIG. 2), which enlarges itself at the other side into the cross section enlarged actuation rod $4a$ that is realised so as to be the pressure compensation piston. Thus, to the closing element $4$ is associated a counter-pressure area $4g$ on the cross section enlarged actuation rod in the transition region to the cross-section reduced connection rod $4b$, in order to compensate pressure jumps in the inner space of the valve housing $2$, $2.1$. The cross section enlarged actuation rod $4a$ continues towards the upside without reduced cross section, up to the driving piston $5$, and is firmly but detachably connected to the latter on its drive side rod end $4e$, which is preferably realised as an external thread. The cross section enlarged actuation rod $4a$ penetrates the central valve housing component $2a$ in the housing opening $2h$ at the upper side (see also FIG. 7 for this), wherein this sliding lead-through is sealed by means of a rod seal $10$ that is disposed in the housing opening $2h$.

Figure 7:
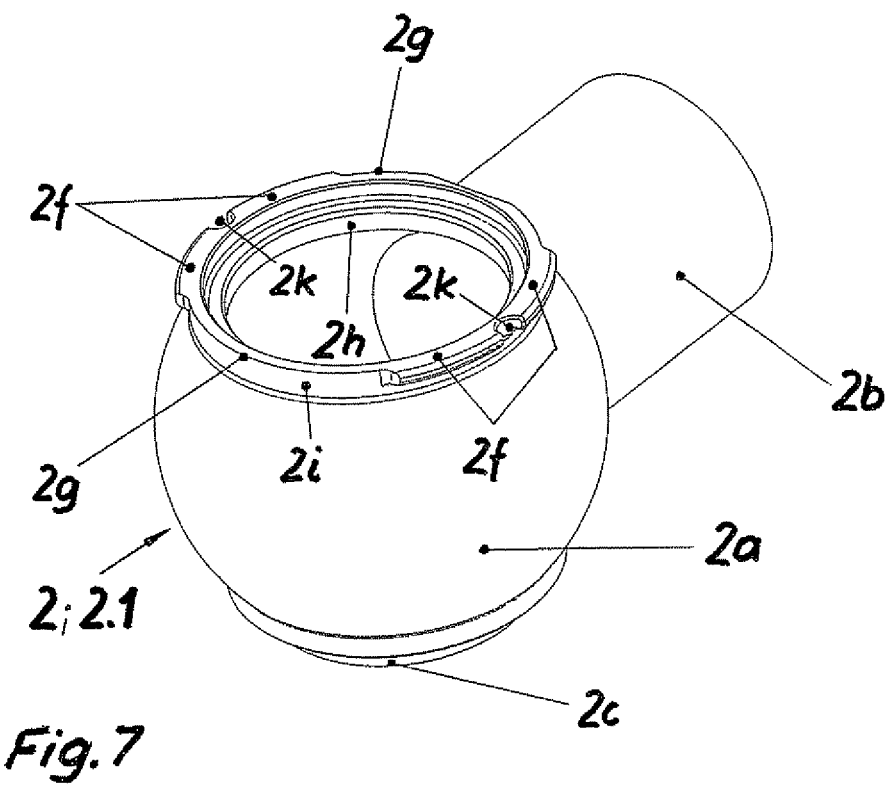
FIG. 7 an embodiment of a lantern housing in a perspective representation, wherein the complementary other half of the bayonet joint of FIG. 6 can be seen on the upper side.

The actuation rod $4a/4b$ having the closing element $4$ is guided in the pipe-shaped bearing bush $6$, which is disposed and fixed within the lantern housing $3.1$ and makes use of the axial length thereof as far as possible. In this, the valve housing side bush flange $6b$ of the bearing bush $6$ rests on the valve housing $2$, $2.1$, which embraces the housing opening $2h$ at the outer side, and so it axially biases the rod seal $10$ that is disposed between the housing opening $2h$ and the cross section enlarged actuation rod $4a$. The rod seal $10$ is embedded into an annular recess within an annular connection piece $2i$, into which the upper end of the valve housing component $2a$ runs out (FIG. 7). Several grooves distributed over the circumference engage into the valve housing side front side of the bearing bush $6$, which piercingly cross the bearing bush $6$ at these locations. These grooves serve for the purpose mentioned above.

Above the bearing bush $6$, the cross section enlarged actuation rod $4a$ penetrates the drive side lantern flange $3.1a$ in a passage opening $3.1f$ (FIGS. 6, 2), this passage being sealed by a first seal $11$ of the drive housing $3a$. This first seal $11$ ensures that no pressure medium D, which is led to the space formed between the lower side of the driving piston $5$, the drive housing $3a$ and the drive side lantern flange $3.1a$ via the first pressure medium opening 3e, can escape from this space into the ring gap between the bearing bush 6 and the cross section enlarged actuation rod 4a. The sealing of the drive side lantern flange 3.1a against the drive housing 3a takes place via a second seal 12, whose fixation in the drive housing 3a is achieved by a locking ring 13. The driving piston 5 is slidingly sealed against the inner periphery of the drive housing 3a by way of a not designated piston seal.

In the cross section enlarged actuation rod 4a is formed the pot-shaped recess 4c, which extends without narrowing with respect to cross section beginning from the drive side rod end 4e up to the lower end of the cross section enlarged actuation rod 4a. In this, in the closed position of the shut-off valve 1.1 the cross section enlarged actuation rod 4a projects into the valve housing component 2a for at least the complete valve stroke H (FIG. 2), so that in the opened position of the shut-off valve 1.1, which opens towards the actuator 3, i.e. after performing the full opening stroke H, the lower end of the cross section enlarged actuation rod 4a just still experiences sealing with respect to the rod seal 10 (see also FIG. 4). A pot bottom 4f or 4f, respectively, of the pot-shaped recess serves as a movable, valve housing side spring abutment 4d for the driving spring 7 or 7.1, 7.2, respectively, which is preferably realised as a helical spring and which may consist of more than one driving spring in the form of a spring packet 7.1, 7.2. On the other side, the driving spring 7 or 7.1, 7.2 rests on the cover part 3b of the actuator 3, a not designated ring circle shaped recess being provided there in order to fix the driving spring 7 or 7.1, 7.2 centrically. Thus, the cover part 3b forms a not displaceable, drive side spring abutment 3c.

Figure 2:
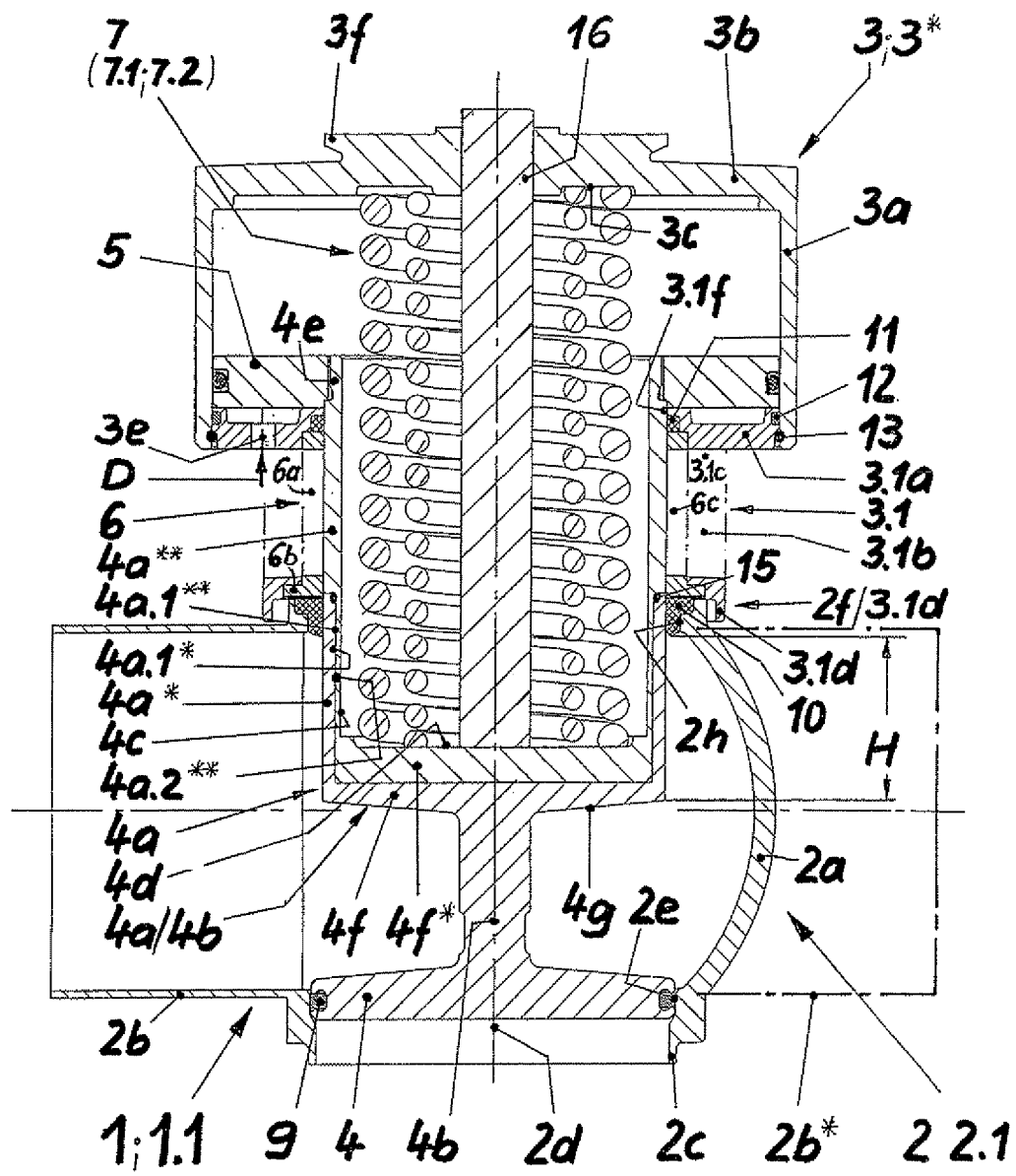
FIG. 2 a meridional section through a preferred embodiment of the shut-off valve of FIG. 1 being in its closed position, with a spring-closing actuator, wherein the cutting plane is selected such that it runs through lantern- and bearing bush openings that cover up themselves in the cutting plane.
Figure 3:
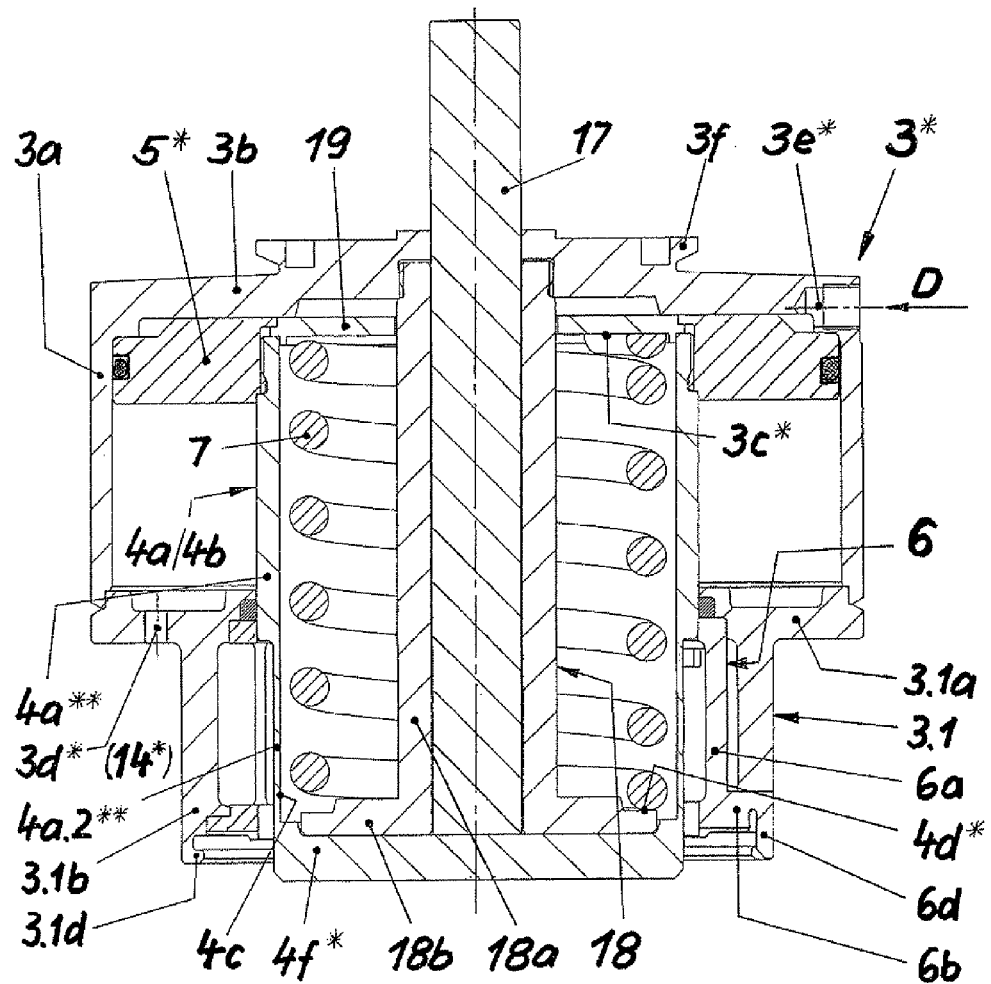
FIG. 3 a meridional section through a spring-opening actuator, as the same may generally find application as an alternative to the spring-closing actuator in the lift valve of the present invention.

In order to fulfil the US requirement in the context of the so-called 3-A Sanitary Standards for Compression-Type Valves mentioned above, which require amongst others that the actuator 3, 3* must be easily dismountable from the valve housing 2, 2.1 and the actuation rod 4a/4b of the closing element 4, the actuation rod 4a/4b is constructed in a dividable fashion (FIG. 2). This division takes place preferably in the region of the cross section enlarged actuation rod 4a, namely into a closing element side component 4a* of the actuation rod and a drive side component 4a** of the actuation rod. A positive and also non-positive connection of these components 4a*, 4a**, sealed by a third seal 15, takes place via a nut thread 4a.1 on the closing element side component 4a* and an external thread on the drive side component 4a. The drive side component 4a of the actuation rod lengthens at its closing element end to a pot 4a.2**, which engages into the closing element side component 4a* of the actuation rod and forms the pot-shaped recess 4c with the second pot bottom 4f* there. Thus, in the separation of the cross section enlarged actuation rod 4a, a lower component 4a* remains on the closing element 4 via the cross section reduced connection rod 4b, and an upper component 4a is firmly but detachably connected to the driving piston 5. The pot 4a.2, which has the contour of the pot-shaped recess 4c at its inner side, like as the same exists in the undivided realisation, prevents that the biased driving spring 7 or 7.1, 7.2, respectively, disposed therein can uncontrollably distress itself when the components 4a*, 4a** are being separated.

Except the support of the driving spring 7 or 7.1, respectively, by the associated spring abutments, the spring-opening actuator 3* is constructed to a great extent like the spring-closing actuator 3 (FIG. 3). In the latter, at its end facing the closing element 4, the driving spring 7 or 7.1, 7.2 rests on a first support plate 18b that is formed on the end of a connection rod 18a, the connection rod 18a penetrating the driving spring 7 or 7.1, 7.2, respectively, being firmly but detachably connected to the cover part 3b. Thus, the connection rod 18a and the first support plate 18b form a stationary cage component 18, which is concentrically penetrated by the modified feedback rod 17 on its entire axial length. The driving spring 7 or 7.1, 7.2, respectively, rests at its other end on a second support plate 19, which is firmly clamped between the driving piston 5* and the drive side end of the actuation rod 4a/4b. Thus, the first support plate 18b forms a modified closing element side spring abutment 4d*, and the second support plate a modified closing element side spring abutment 3c*.

Figure 6:
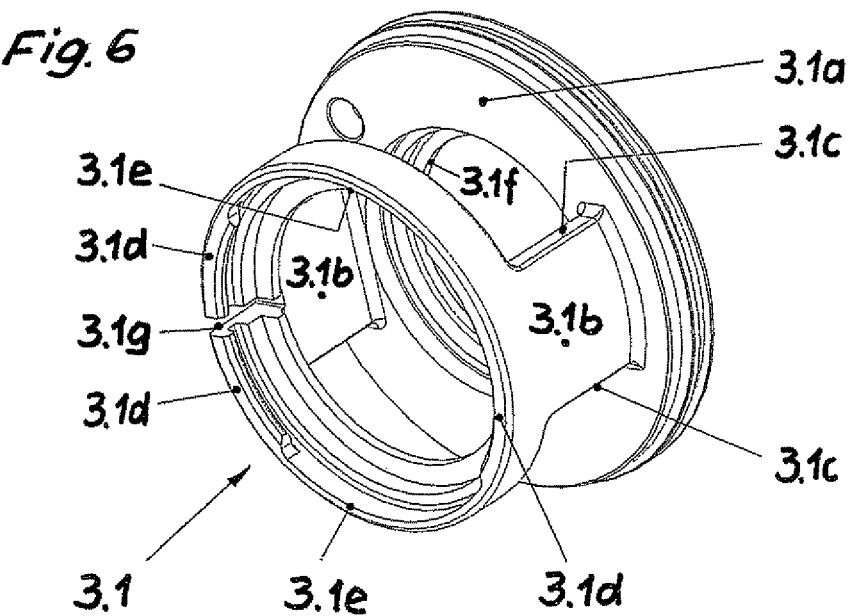
FIG. 6 an embodiment of a lantern housing in a perspective representation, which has a drive side lantern flange at the one end, which forms the valve housing side delimitation of the drive housing of the actuator, and on whose other end the one half of a bayonet joint can be seen.

A positive and also non-positive connection between the valve housing 2, 2.1 at the one hand, and the lantern housing 3.1 and by this also with the actuator 3, 3* on the other hand, is provided by a bayonet joint 2f, 2g/3.1d, 3.1e or a bayonet joint like connection (FIG. 1 in connection with FIGS. 2, 6, 7). For this purpose, the pipe-shaped lantern shaft 3.1b (FIG. 6) has at its valve housing side end at least two lantern side bayonet collars 3.1d that project radially towards the inside when seen in the radial direction and which are each delimited at both sides by lantern side bayonet recesses 3.1e formed between them. At its outer side and in the circumference region of the valve opening 2h, the valve housing 2, 2.1 (FIG. 7) has a corresponding number of valve housing side bayonet collars 2f that project radially towards the outside when seen in the radial direction, and which are each delimited at both sides by valve housing side bayonet recesses 2g formed between them. In an opened position of the bayonet joint, the lantern side bayonet collars 3.1d engage into the valve housing side bayonet recesses 2g, and in a closed position of the bayonet joint, they grip behind the valve housing side bayonet collars 2f almost coincidently (bayonet joint 2f/3.1d).

With respect to the first connecting sleeve 2b, the two valve housing side bayonet joints 2f are arranged on the valve housing component 2a in an offset of preferably 90 degrees, so that the preferably substance to substance joining of the connection between the first connecting sleeve 2b and the valve housing component 2a, which is performed normally by mechanized orbital welding, is not impeded by this valve housing side bayonet collar 2f. The valve housing side bayonet recess 2g engages radially at the inner side up to the annular sleeve 2i. In the shown realisation example, two diametrically arranged valve housing side bayonet collars 2f and correspondingly two valve housing side bayonet recesses 2g form the one part of the bayonet joint 2f, 2g/3.1d, 3.1e. The two diametrically arranged lantern side bayonet collars 3.1d and the two lantern side bayonet recesses 3.1e form the other part of the bayonet joint 2f, 2g/3.1d, 3.1e. Another advantageous embodiment of the bayonet joint 2f, 2g/3.1d, 3.1e provides more than two lantern side bayonet collars 3.1d, which are evenly distributed over the circumference of the pipe-shaped lantern shaft 3.1b. The valve housing side part of the bayonet joint 2f, 2g is formed complementary in this case.

The bayonet joint 2f, 2g/3.1d, 3.1e or the bayonet-like connection is automatically positively locked in its closed position (FIGS. 1, 4, 6, 7). For this purpose, the pipe-shaped lantern shaft 3.1b has a slit 3.1g (FIGS. 6, 1) in the circumferential region of the extension of at least one lantern side bayonet collar 3.1d, said slit extending somewhat into the same from the valve housing side end of the lantern shaft 3.1b, and in doing so piercingly from the inside to the outside when seen in the radial direction.

Radially at the outer side, each valve housing side bayonet collar 2f has a groove-shaped recess 2k which is delimited in its radial depth and its circumferential extension (FIG. 7), wherein in the closed position of the bayonet joint, the recess 2k is positioned coincidently with the associated slit 3.1g when seen in the circumferential direction. The respective recess 2k is preferably disposed centrically in the associated valve housing side bayonet collar 2f when seen in the circumferential direction.

In the region of the valve housing side end of the bearing bush 6, at least one nose 6d is disposed on the same (FIGS. 8, 9, 4, 1), which seen in the radial direction projects beyond the outer border of the bearing bush 6 on the one hand, and on the other hand extends beyond the valve housing side front side of the bearing bush 6 when seen in the axial direction. Seen in the radial direction, the nose 6d is made spring resilient and engages into the associated slit 3.1g (FIG. 1), whereby an unambiguous circumferential fixation of the bearing bush 6 in the lantern housing 3.1 is ensured.

Figure 4:
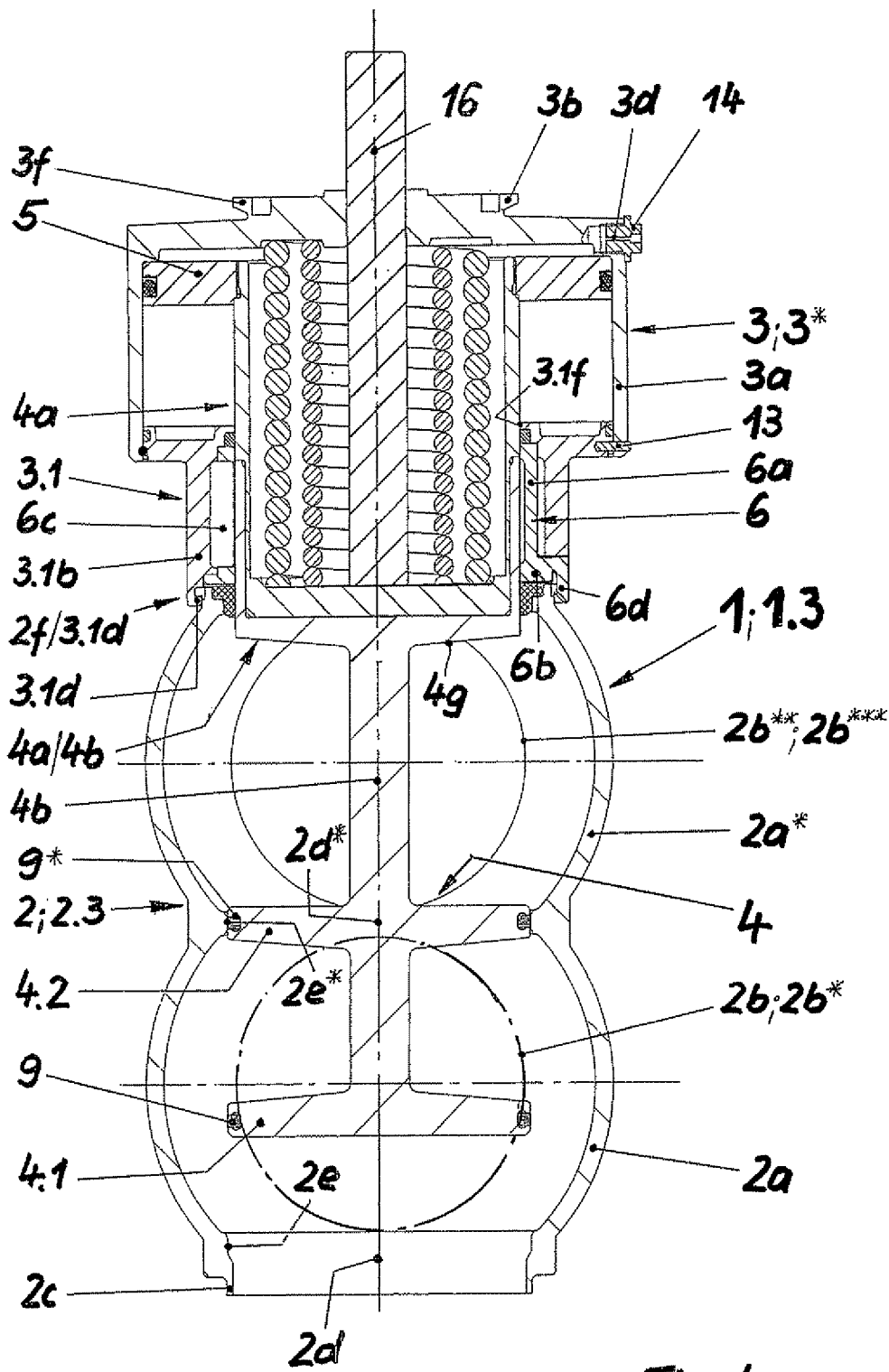
FIG. 4 a meridional section through the lift valve of the present invention in a realisation as a reversing valve, wherein the monolithic closing element that can be advanced into two reversing positions and which has two alternative sealing sites disposed in a distance from each other, is brought into its upper reversing position by pressure fluid pressurization against the force of the driving spring, and the cutting plane is selected such that it runs through a nose on a bearing bush that locks the bayonet joint.

In order to positively lock the bayonet joint 2f, 2g/3.1d, 3.1e automatically, it is provided that the end of the nose 6d engages into the associated recess 2k in the closed position thereof (FIG. 4).

The features described above of the lift valve 1 of the present invention are advantageously applied to a reversing valve 1.3 (FIG. 4), in which the lantern housing 3.1 is connected to the valve housing component 2a via a second valve housing component 2a* having at least one fourth connecting sleeve 2b**, and the valve housing 2, 2.3 is realised in the form of a third valve housing 2.3 functioning as a reversing valve housing through this. The two valve housing components 2a, 2a* are connected via a second connection opening 2d*, in or on which a cylindrically shaped second seating area 2e* is formed. A second closing element 4.2 is additionally fastened on the actuation rod 4a/4b in the region of the cross section reduced actuation rod 4b, which co-operates with the second seating area 2e* via a radially acting closing element seal 9* and controls the second connection opening 2d*. In the closed position of the second closing element 4.2, the closing element 4 forming a first closing element 4.1 takes on its opened position, and in the closed position of the first closing element 4.1 the same applies for the second closing element 4.2.

If need be, the valve housing component 2a becomes a passage housing when the same has a third connecting sleeve 2b* in addition to the first connecting sleeve 2b, which is situated opposite to the first connecting sleeve 2b. In an equivalent manner, the second valve housing component 2a* becomes a passage housing if need be, when the same has a fifth connecting sleeve 2b* in addition to the fourth connecting sleeve 2b, which is situated opposite to the fourth connecting sleeve 2b**.

Figure 5:
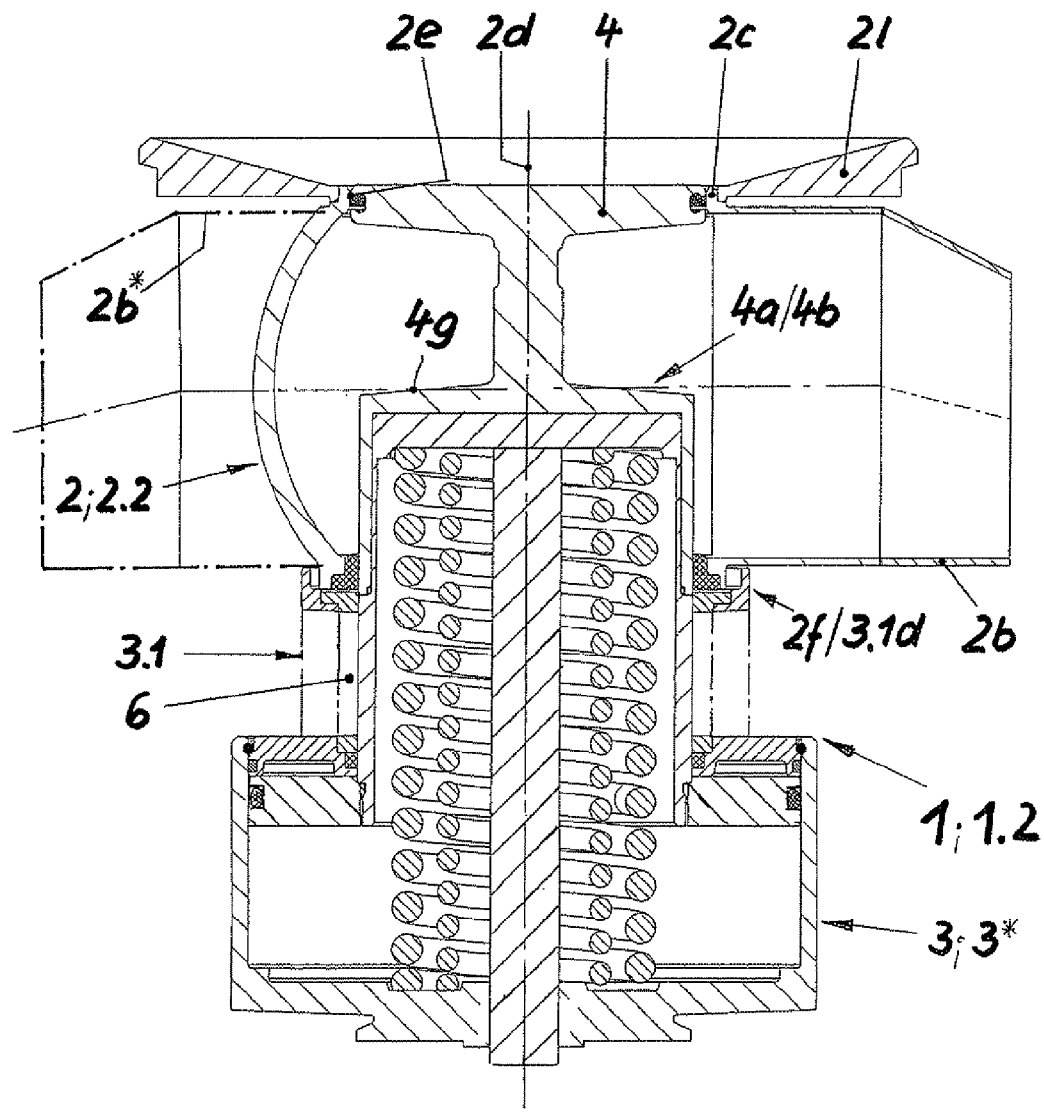
FIG. 5 a meridional section through the lift valve of the present invention in a realisation as a tank bottom valve, wherein in the depicted closed position, a spring-closing actuator closes a tank bottom opening by the closing element, and again, the cutting plane is selected such that it runs through the lantern- and bearing bush openings that cover each other up in the cutting plane.

By the above configuration, the reversing function is realised, in which a connection between the first and occasionally third connecting sleeve 2b and 2b*, respectively, on the one hand, and the second connecting sleeve 2c on the other hand is produced in the depicted upper position of the closing element 4, wherein its second closing element 4.2 occupies a closed position. In the lower position of the closing element 4, wherein its first closing element 4.1 occupies a closed position, the fourth and occasionally the fifth closing element 2b and 2b*, respectively, are connected to the first connecting sleeve 2b on the According to a further proposition, the above-described features of the lift valve 1 of the present invention are applied to a tank bottom valve 1.2 (FIG. 5), in which the second connecting sleeve 2c runs out into a tank bottom 21 of a tank or container from out the downside, and the valve housing 2, 2.2 is realised as a second valve housing 2.2 acting as a tank bottom valve housing. The latter becomes a passage housing if needed, when the same has a third connecting sleeve 2b* on the valve housing component 2a in addition to the first connecting sleeve 2b, which is situated opposite to the first connecting sleeve 2b.

From that which was mentioned above, it will be obvious that different modifications and variants may be realised without diverting from the spirit and the new concept of the present invention. This is to be understood such that no limitation is intended to the embodiments which are depicted and described or only described here. The disclosure is intended to comprise all such modifications which are inside the protection coverage that is called for by the claims.

This completes the description of the preferred and alternate embodiments of the invention. Those skilled in the art may recognize other equivalents to the specific embodiment described herein which equivalents are intended to be encompassed by the claims attached hereto.

LIST OF REFERENCE SIGNS OF THE USED ABBREVIATIONS 1 lift valve (in general)
1.1 shut-off valve
1.2 tank bottom valve
1.3 reversing valve
2 valve housing (in general)
2a valve housing component
2b first q4
2c second q4
2d connection opening
2e seating area (cylindrical, conical, axial)
2f bayonet collar at the valve housing side
2g bayonet recess at the valve housing side
2h housing opening
2i annular connection piece
2k groove-shaped recess
Shut-Off Valve (1.1)
2.1 first valve housing (shut-off valve housing)
2b* third connecting sleeve
Tank Bottom Valve (1.2)
2.2 second valve housing (tank bottom valve housing)
2b* third connecting sleeve
2l tank bottom
Reversing Valve (1.3)
2.3 third valve housing (reversing valve housing)
2a* second valve housing component
2b* third q4
2b** fourth connecting sleeve
2b*** fifth connecting sleeve
2d* second connection opening
2e* (cylindrical) second seating area
4.1 first closing element
4.2 second closing element
g* second closing element seal
3 first actuator
3a drive housing
3b cover part
3c spring abutment at the drive side
3d first ventilation opening
3e first pressure medium opening
3f clamp flange
3.1 lantern housing
3.1a lantern flange at the drive side
3.1b pipe-shaped lantern shaft
3.1c lantern opening
3.1d bayonet collar at the lantern side
3.1e bayonet recess at the lantern side
3.1f passage opening 3.1g slit
2f; 2g/3.1d, 3.1e bayonet joint
2f/3.1d bayonet lock
4 closing element (in general)
4A/4b actuation rod
4a cross-section enlarged actuation rod (pressure compensation piston)
4b cross-section reduced actuation rod
4c pot-shaped recess
4d spring abutment at the closing element side
4e rod end at the drive side
4f pot bottom
4f* second pot bottom
4g counter-pressure surface
4a* component of the actuation rod 4a at the closing element side
4a** component of the actuation rod 4a at the drive side
4a.1* nut thread (on the lower part 4a*)
4a.1 external thread (on the upper part 4a)
4a.2** pot
5 driving piston
6 q7
6a pipe-shaped bush shaft
6b bush flange at the valve housing side
6c bearing bush opening
6d nose
7 driving spring
7.1 first bearing bush
7.2 second bearing bush
9 closing element seal
10 rod seal
11 first seal (drive housing)
12 second seal (drive housing)
13 locking ring
14 ventilation plug
15 third seal (pressure compensation piston)
16 feedback rod
Actuator (Spring-Opening)
3* second actuator (spring-opening)
3c* modified spring abutment distant from closing element
3d* second ventilation opening
3e* second pressure medium opening
4d* modified spring abutment at the closing element side
5* modified driving piston
14* second ventilation plug
17 modified feedback rod
18 cage part (stationary)
18a connection rod (stationary)
18b first support plate (stationary)
19 second support plate (movable)
D pressure medium
H (full) valve stroke

The invention claimed is:

1. A lift valve (1; 1.1; 1.2; 1.3), particularly for process technology,
with a valve housing (2; 2.1; 2.2; 2.3) consisting of at least one valve housing component (2a), with at least a first and a second connecting sleeve (2b, 2c), which are connected to the valve housing component (2a) and produce a connection to the interior space thereof, with a connection opening (2d) arranged in the valve housing (2; 2.1; 2.2; 2.3) between the connecting sleeves (2b, 2c), in or on which connection opening a seating area (2e) is formed, with a translationally displaceable monolithic closing element (4; 4.1) which co-operates with the seating area (2e) and controls the connection opening (2d), with one single actuation rod (4a/4b) fastened on the closing element (4; 4.1) and being sealingly guided out of the valve housing (2; 2.1; 2.2; 2.3) through a housing opening (2h) of the same in front of the connection opening (2d) and being connected to a driving piston (5; 5*) of an actuator (3; 3*), with a lantern housing (3.1) connecting the valve housing (2; 2.1; 2.2; 2.3) with the actuator (3; 3*), with the actuator (3; 3*) which has in a drive housing (3a) the driving piston (5; 5*) that is displaceable against the force of a driving spring (7; 7.1; 7.2) and upon pressurization with a pressure medium (D), and with the actuation rod (4a/4b), which is enlarged in its cross section at least in the penetration region with the valve housing (2; 2.1; 2.2; 2.3), such that it accommodates there a part of the driving spring (7; 7.1; 7.2) at the closing element side thereof in a pot-shaped recess (4c)
characterised in that
the closing element (4; 4.1) opens towards the actuator (3; 3*), and that the ends of the driving spring (7; 7.1; 7.2) rest against the actuation rod (4a/4b) on the one hand, and against a cover part (3b) on the other hand, respectively, said cover part (3b) delimiting the drive housing (3a) on that side of the driving piston (5; 5*) which faces away from the closing element (4; 4.1).

2. Lift valve according to claim 1,
characterised in that
the actuation rod (4a/4b) is realised such that a cross-section enlarged actuation rod (4a) is connected to the closing element (4) via a cross-section reduced actuation rod (4b) that is smaller in its cross section.

3. Lift valve according to claim 2,
characterised in that
a counter-pressure area (4g) on the cross-section enlarged actuation rod (4a) in the transition region to the cross-section reduced actuation rod (4b) is associated to the closing element (4), in order to compensate pressure shocks in the interior space of the valve housing (2; 2.1; 2.2; 2.3).

4. Lift valve according to claim 1,
characterised in that
the cross-section enlarged actuation rod (4a) projects into the valve housing (2; 2.1; 2.2; 2.3) at least for the full valve stroke (H).

5. Lift valve according to claim 1,
characterised in that
with respect to its cross section, the pot-shaped recess (4c) continues up to the driving piston (5; 5*) without becoming narrower.

6. Lift valve according to claim 1,
characterised in that
a pot bottom (4f; 4f*) of the pot-shaped recess (4c) forms a spring abutment (4d) of the driving spring (7; 7.1; 7.2) at the closing element side thereof.

7. Lift valve according to claim 1,
characterised in that
for the purpose of dismounting the actuator (3; 3*) from the valve housing (2; 2.1; 2.2; 2.3), the actuation rod (4a/4b) is structured dividably.

8. Lift valve according to claim 7,
characterised in that
it is provided to divide the cross-section enlarged actuation rod (4a) into one component of the actuation rod (4a*) at the closing element side and one component of the actuation rod (4a**) at the drive side, and that a sealed positive and non-positive connection of these components (4a*, 4a**) takes place via a nut thread (4a.1*) at the closing element side component (4a*), and via an exterior thread on the drive side component (4a**).

9. Lift valve according to claim 1, characterised in that on a rod end (4e) at the drive side, the actuation rod (4a/4b) is detachably connected to the driving piston (5; 5*).

10. Lift valve according to claim 8, characterised in that on its end at the closing element side, the drive side component of the actuation rod (4a) lengthens into a pot (4a.2), which engages into the closing element side component of the actuation rod (4a*) and forms there the pot-shaped recess (4c) having a second pot bottom (4P).

11. Lift valve according to claim 1, characterised in that the lantern housing (3.1) has a pipe-shaped lantern shaft (3.1b) with a drive side lantern flange (3.1a) at the one end, and means (3.1d, 3.1e) for connecting the lantern housing (3.1) with the valve housing (2; 2.1; 2.2; 2.3) on the other end, and at least one lantern opening (3.1c) disposed in the lantern shaft (31.b) and breaking through the same.

12. Lift valve according to claim 11, characterised in that the lantern housing (3.1) is directly fixed on the actuator (3; 3*) with its lantern flange (3.1a).

13. Lift valve according to claim 11, characterised in that the lantern flange (3.1a) forms the border of the drive housing (3a) at the valve housing side.

14. Lift valve according to claim 1, characterised in that the actuation rod (4a/4b) is detachably connected to a feedback rod (16; 17), which concentrically penetrates the actuator (3; 3*) and which in the closed position of the lift valve (1; 1.1; 1.2; 1.3) permeates the cover part (3b) and a clamp flange (3f), formed on the same at the outside thereof and serving for the connection of a control head, said feedback rod (16; 17) ending in an overhang with respect to the clamp flange (3f).

15. Lift valve according to claim 1, characterised in that the closing element (4; 4.1) is realised as a seat disk with an axially or axially/radially acting closing element seal (9) and co-operating with the associated seating area (2e) that is realised axially or in a cone shape, and that the closed position of the lift valve (1; 1.1; 1.2; 1.3) is delimited by a firm rest of the closing element (4; 4.1) on the respective seating area (2e).

16. Lift valve according to claim 1, characterised in that the closing element (4; 4.1) is realised as a slide piston with a radially acting closing element seal (9) and which co-operates with the associated seating area (2e) that is realised cylindrically, and that the closed position of the lift valve (1; 1.1; 1.2; 1.3) is delimited by a firm rest of the driving piston (5; 5*) in the actuator (3; 3*).

17. Lift valve according to claim 1, characterised in that at its end facing the closing element (4; 4.1), the driving spring (7; 7.1; 7.2) is supported on a first support plate (18b), which is fixedly connected to the cover part (3b) via a connection rod (18a) that penetrates the driving spring (7; 7.1; 7.2), and that the driving spring (7; 7.1; 7.2) is supported on its other end on a second support plate (19), which is fixedly clamped between the driving piston (5*) and the drive side end of the actuation rod (4a/4b).

18. Lift valve according to claim 1, characterised in that the lantern housing (3.1) is attached to the valve housing (2; 2.1; 2.2; 2.3) by a bayonet joint (2f, 2g/3.1d, 3.1e) or a bayonet-like connection.

19. Lift valve according to claim 18, characterised in that at its valve housing side end, the pipe-shaped lantern shaft (3.1b) has at least two lantern side bayonet collars (3.1d) projecting radially towards the inside when seen in the radial direction, which are each delimited on both sides by lantern side bayonet recesses (3.1e) realised between them, that on the outside and in the circumference region of the housing opening (2h), the valve housing (2; 2.1; 2.2; 2.3) has a corresponding number of valve housing side bayonet collars (2f) projecting radially towards the outside when seen in the radial direction, which are each delimited on both sides by valve housing side bayonet recesses (2g) realised between them, wherein the lantern side bayonet collars (3.1d) engage into the valve housing side bayonet recesses (2g) in an opened position of the bayonet joint, and almost coincidentally grip behind the valve housing side bayonet collars (2f) in a closed position of the bayonet joint.

20. Lift valve according to claim 19, characterised in that two lantern side bayonet collars (3.1d) are provided, which are situated diametrically opposite to each other.

21. Lift valve according to claim 19, characterised in that more than two lantern side bayonet collars (3.1d) are provided, which are disposed evenly distributed over the circumference of the pipe-shaped lantern shaft (3.1b).

22. Lift valve according to claim 1, characterised in that the actuation rod (4a/4b) is guided in a pipe-shaped bearing bush (6), which is arranged and fixed inside the lantern housing (3.1) and which makes use of the axial length thereof as far as possible.

23. Lift valve according to claim 22, characterised in that the bearing bush (6) has at least one bearing bush opening (6c), penetrating the wall of a pipe-shaped bush shaft (6a) when seen in the radial direction.

24. Lift valve according to claim 23, characterised in that the at least one bearing bush opening (6c) is at least partially covered up by the at least one lantern opening (3.1c) in a fluid-permeable manner.

25. Lift valve according to claim 22, characterised in that a valve housing side bush flange (6b) of the bearing bush (6) rests on the valve housing (2; 2.1; 2.2; 2.3) which surrounds the housing opening (2h) at the outer side, and that it axially biases a rod seal (10d) disposed between the housing opening (2h) and the cross-section enlarged actuation rod (4a) through this.

26. Lift valve according to claim 22, characterised in that several grooves distributed over the circumference engage into the front side of the bearing bush (6) at the valve housing side, which piercingly cross the bearing bush (6) on these locations.

27. Lift valve according to claim 18,
characterised in that
the bayonet joint (2f, 2g/3.1d, 3.1e) or the bayonet-like connection is automatically positively fitting locked in its closed position.

28. Lift valve according to claim 19,
characterised in that
in the extension region of at least one lantern side bayonet collar (3.1d) with respect to the circumference, the pipe-shaped lantern shaft (3.1b) has a slit (3.1g), which extends somewhat into the bayonet collar (3.1d) from the valve housing side of the lantern shaft (3.1b), and by doing so piercingly from the inside towards the outside when seen in the radial direction.

29. Lift valve according to claim 19,
characterised in that
radially at the outer side, each valve housing side bayonet collar (2f) has a groove-shaped recess (2k), delimited in its radial depth and its circumferential extension, wherein in the closed position of the bayonet joint, the recess (2k) is positioned coincidentally with the associated slit (3.1g) when seen in the circumferential direction.

30. Lift valve according to claim 29,
characterised in that
the respective recess (2k) is disposed centrally in the associated bayonet collar (2f) at the valve housing side when seen in the circumference direction.

31. Lift valve according to claim 28,
characterised in that
in the region of the valve housing side end of the bearing bush (6), at least one nose (6d) is disposed on the same which, when seen in the radial direction, is salient over the outer border of the bearing bush (6) at the one hand, and which on the other hand, when seen in the axial direction, extends beyond the front side of the bearing bush (6) at the valve housing side thereof, and that the nose (6d) when seen in the radial direction is realised spring-resiliently and engages into the associated slit (3.1g).

32. Lift valve according to claim 31,
characterised in that
in the locking position of the bayonet joint, the end of the nose (6d) engages into the associated recess (2k).

33. Lift valve according to claim 1,
characterised in that
the respective features are applied to a shut-off valve (1.1), and the valve housing (2; 2.1) is realised in the form of a first valve housing (2.1) acting as a shut-off valve housing.

34. Lift valve according to claim 1,
characterised in that
the respective features are applied to a tank bottom valve (1.2), wherein the second connecting sleeve (2c) runs out from the downside into a tank bottom (21) of a tank or container, and the valve housing (2; 2.2) is realised in the form of a second valve housing (2.2) acting as a tank bottom valve housing.

35. Lift valve according to claim 1,
characterised in that
the respective features are applied to a reversing valve (1.3), wherein the lantern housing (3.1) is connected to the valve housing component (2a) via a second valve housing component (2a*) having at least one fourth connecting sleeve (2b**), and that through this the valve housing (2; 2.3) is realised in the form of a third valve housing (2.3) acting as a reversing valve housing, wherein the two valve housing components (2a, 2a*) are connected via a second connection opening (2d*) in or on which a second seating area (2e*) is realised, wherein on the actuation rod (4a/4b) a second closing element (4.2) is attached in addition, which co-operates with the second seating area (2e*) via a radially acting second closing element seal (9*) and which controls the second connection opening (2d*), wherein in the closed position of the second closing element (4.2), the closing element (4) forming a first closing element (4.1), and in the closed position of the first closing element (4.1) the second closing element (4.2) occupy their respective opened positions.

36. Lift valve according to claim 35,
characterised in that
in addition to the fourth connecting sleeve (2b**), the third valve housing (2; 2.3) has on the second valve housing component (2a*) a fifth connecting sleeve (2b*), which is situated opposite to the fourth connecting sleeve (2b).

37. Lift valve according to claim 33,
characterised in that
in addition to the first connecting sleeve (2b), the valve housing (2; 2.1; 2.2; 2.3) has on the valve housing component (2a) a third connecting sleeve (2b*), which is situated opposite to the first connecting sleeve (2b).

* * * * *

UNITED STATES PATENT AND TRADEMARK OFFICE
CERTIFICATE OF CORRECTION

PATENT NO. : 8,496,027 B2
APPLICATION NO. : 12/867688
DATED : July 30, 2013
INVENTOR(S) : Jens Burmester It is certified that error appears in the above-identified patent and that said Letters Patent is hereby corrected as shown below:

In the Claims

Column 19, Line 15, delete "(4P)" and insert --(4f*)--.

Column 21, Line 23, delete "coincidentally" and insert --coincidently--.

Signed and Sealed this
Fifteenth Day of October, 2013

Teresa Stanek Rea
*Deputy Director of the United States Patent and Trademark Office*